US009862899B2

(12) United States Patent
Rehmat

(10) Patent No.: US 9,862,899 B2
(45) Date of Patent: Jan. 9, 2018

(54) GAS DISTRIBUTION ARRANGEMENT FOR ROTARY REACTOR

(71) Applicant: Amirali G. Rehmat, Darien, IL (US)

(72) Inventor: Amirali G. Rehmat, Darien, IL (US)

(73) Assignee: Simple Approach Systems, Inc., Schaumburg, IL (US)

( * ) Notice: Subject to any disclaimer, the term of this patent is extended or adjusted under 35 U.S.C. 154(b) by 376 days.

(21) Appl. No.: 13/747,277

(22) Filed: Jan. 22, 2013

(65) Prior Publication Data

US 2014/0202079 A1 Jul. 24, 2014
US 2017/0226435 A9 Aug. 10, 2017

Related U.S. Application Data

(63) Continuation of application No. 12/463,848, filed on May 11, 2009, now abandoned.

(30) Foreign Application Priority Data

May 12, 2008 (IN) .......................... 1157/CHE/2008

(51) Int. Cl.

| | |
|---|---|
| ***B01J 7/00*** | (2006.01) |
| ***C10J 3/00*** | (2006.01) |
| ***F27B 7/30*** | (2006.01) |
| *F27B 7/36* | (2006.01) |

(52) U.S. Cl.

CPC ................. *C10J 3/005* (2013.01); *F27B 7/30* (2013.01); *F27B 7/362* (2013.01)

(58) Field of Classification Search

CPC ............ C10J 3/74; C10J 3/005; F27B 9/3011; F27B 2007/367; F27B 9/20; F23G 2203/206

See application file for complete search history.

(56) References Cited

U.S. PATENT DOCUMENTS

| | | | | |
|---|---|---|---|---|
| 2,975,499 A * | 3/1961 | Lapp | F27B 9/20 | 264/606 |
| 4,181,504 A * | 1/1980 | Camacho | C10J 3/20 | 110/250 |
| 4,208,181 A * | 6/1980 | Rossi | C21B 13/08 | 266/96 |
| 4,273,314 A * | 6/1981 | Keran | C21B 13/08 | 266/145 |

(Continued)

*Primary Examiner* — Imran Akram

(74) *Attorney, Agent, or Firm* — Baker Donelson; Nigamnarayan Acharya

(57) ABSTRACT

A port assembly for controlling the delivery of gases into the horizontal rotating reactor such as kiln gasifier is disclosed for introducing reactant gases. The port assembly comprises a cylindrical conduit is divided into noncommunicating four or more sections extending through the entire length of the kiln and supported by the stationary end plates of the rotating kiln gasifier. Each section of the conduit communicates with external supply of the reactant gases and each supply of reactant gases is independently controlled in terms of the composition and quantity. Each section of the port assembly communicates with the interior of the kiln gasifier through the plurality of nozzles are confined in the lower part of the conduit. The number and the size of the nozzles in individual section of the conduit is based on the desired flow of gases and available pressure for the supply of the reactant gases.

11 Claims, 6 Drawing Sheets

(56) References Cited

U.S. PATENT DOCUMENTS

| | | | | | |
|---|---|---|---|---|---|
| 4,318,713 | A * | 3/1982 | Lee | C10J 3/005 | 48/203 |
| 4,336,769 | A * | 6/1982 | Daman | 122/4 D | |
| 4,678,491 | A * | 7/1987 | Tsai | C03B 3/02 | 432/110 |
| 4,834,646 | A * | 5/1989 | Terashima | F27B 9/12 | 432/144 |
| 5,156,676 | A * | 10/1992 | Garrett | C04B 7/4438 | 106/745 |
| 5,451,255 | A * | 9/1995 | Hansen | C04B 7/44 | 106/743 |
| 5,549,058 | A * | 8/1996 | Tutt | C04B 7/4438 | 110/109 |
| 5,632,616 | A * | 5/1997 | Tutt | C04B 7/364 | 110/246 |
| 2002/0086258 | A1* | 7/2002 | Hansen | F27B 7/00 | 432/103 |
| 2007/0207432 | A1* | 9/2007 | Hansen | C04B 7/43 | 432/14 |
| 2009/0277090 | A1* | 11/2009 | Rehmat et al. | 48/113 | |
| 2011/0116984 | A1* | 5/2011 | Rehmat | F27B 7/36 | 422/184.1 |
| 2012/0217442 | A1* | 8/2012 | Jeney | F23G 5/0276 | 252/373 |

* cited by examiner

FIG 1: GENERAL ARRANGEMENT OF GAS DISTRIBUTION FOR A KILN GASIFIER
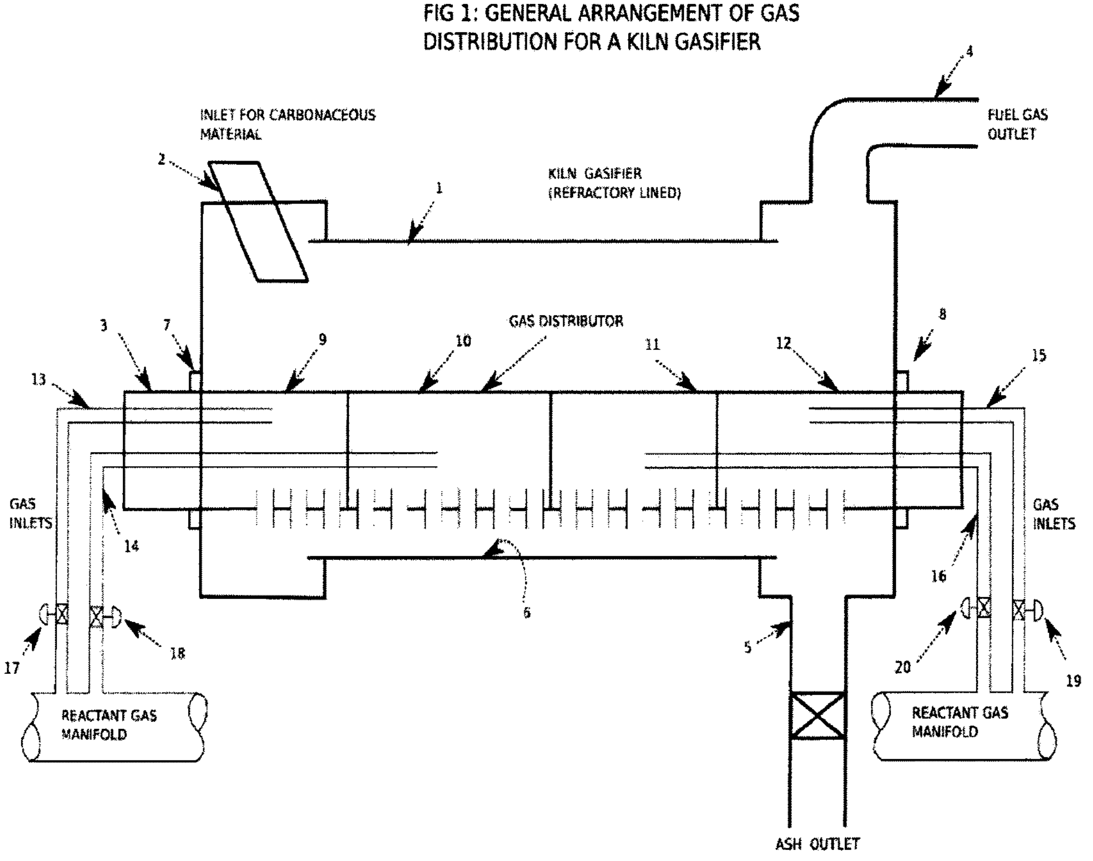

FIG 2: DEPICTION OF BIOMASS GASIFICATION STEPS IN A KILN GASIFIER
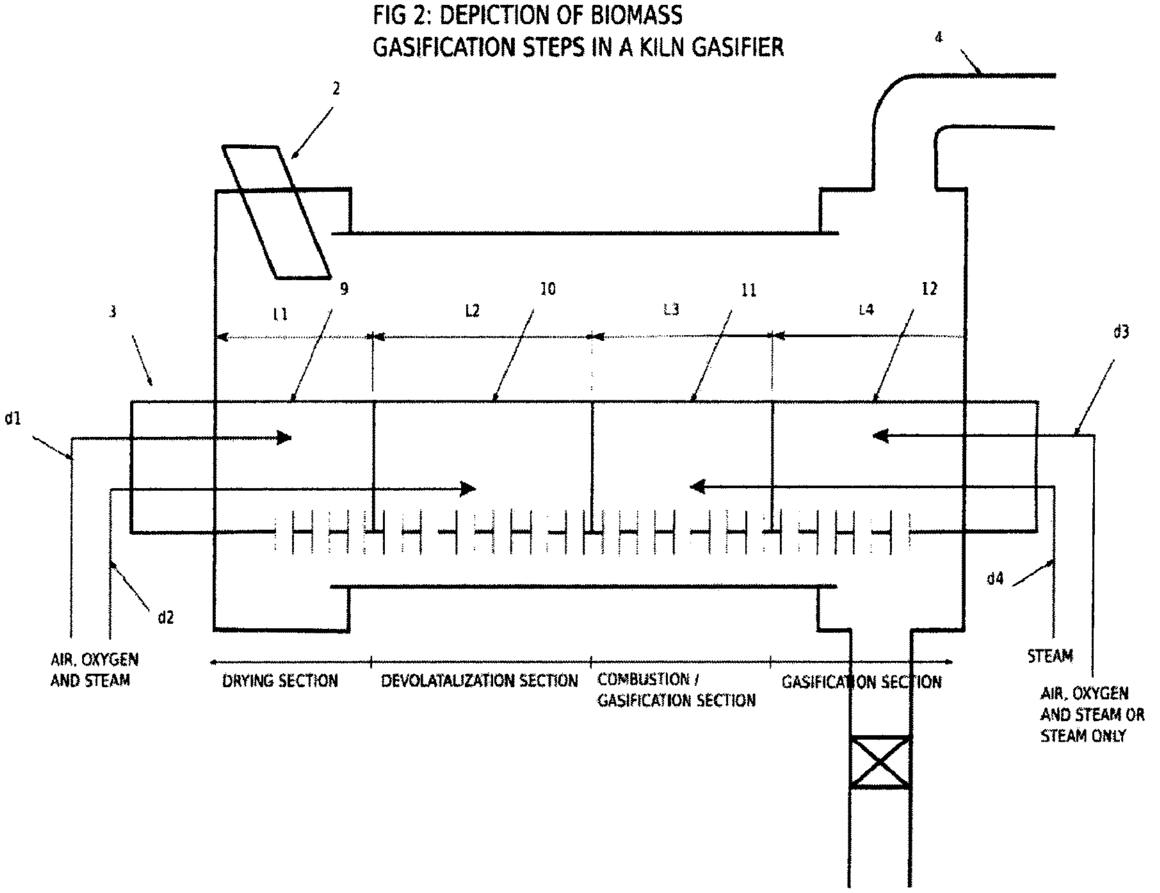

FIG 3: BOTTOM VIEW OF GAS DISTRIBUTOR
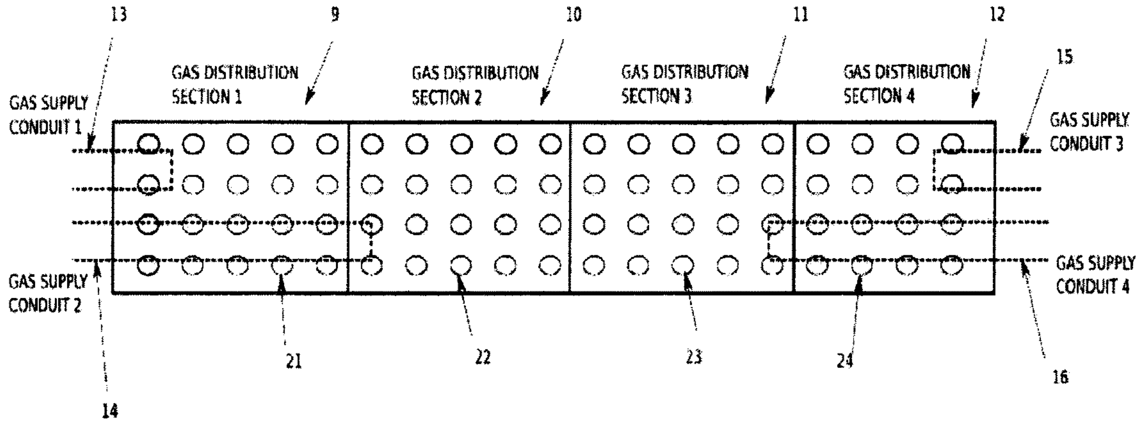

FIG 4: CROSS SECTION VIEW OF THE KILN GASIFIER
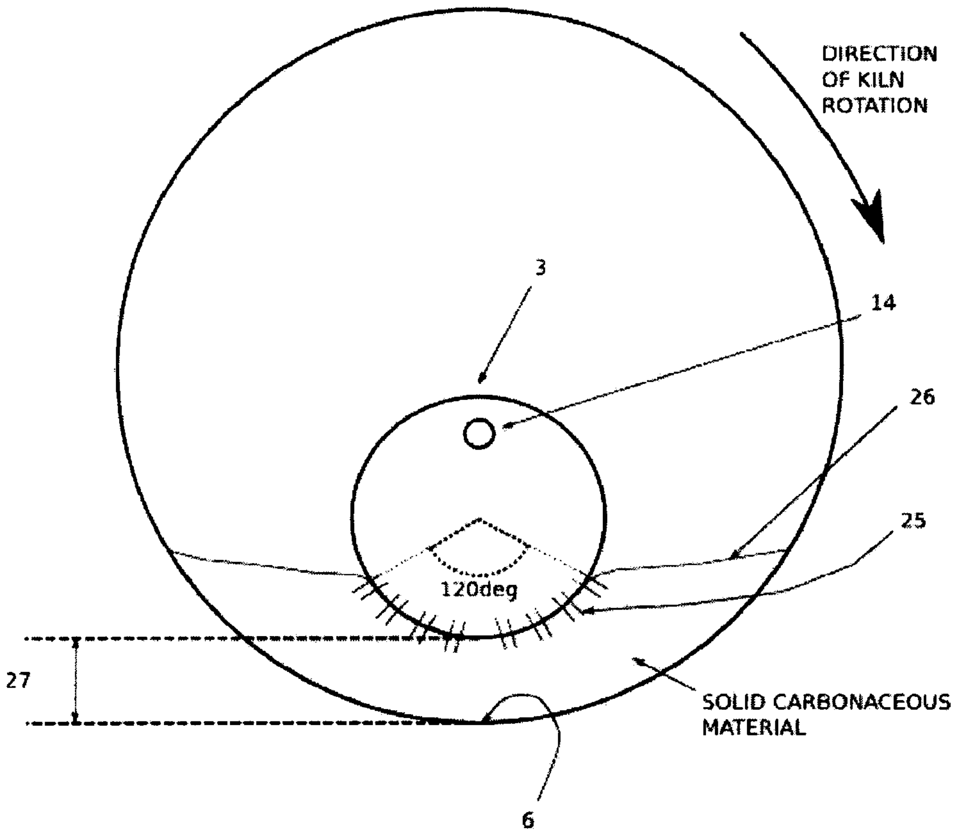

FIG 5: EXPANDED CROSS SECTION VIEW OF ONE SECTION OF GAS DISTRIBUTION
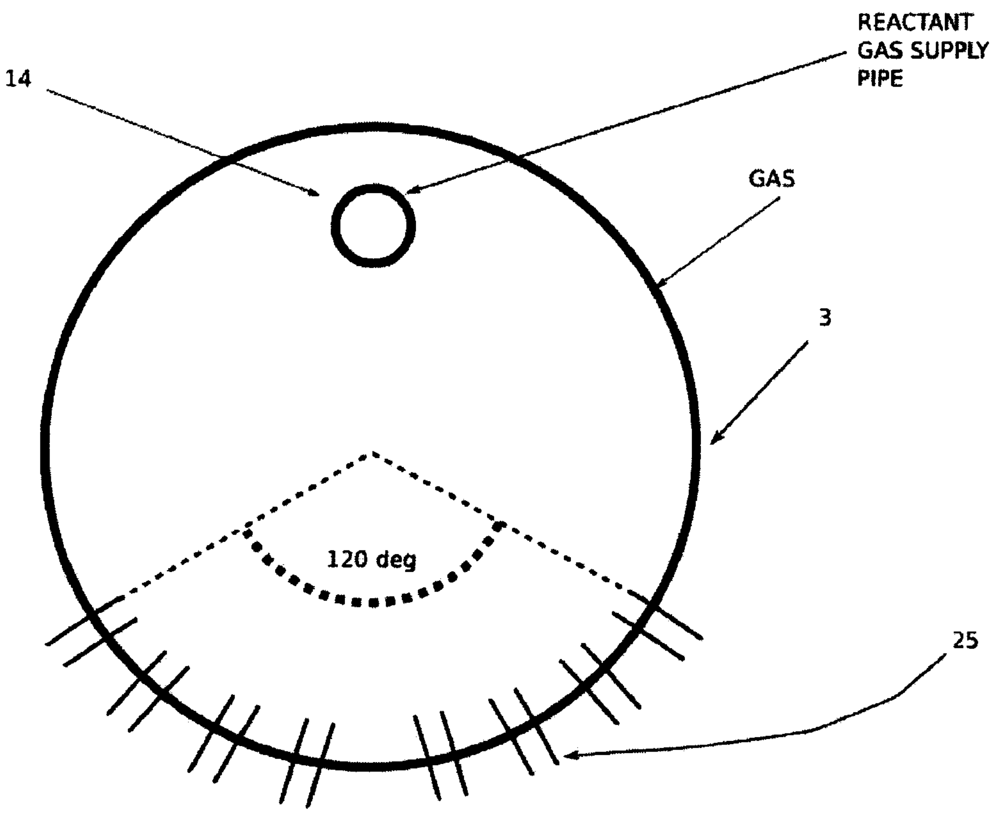

FIG 6: TEMPERATURE PROFILE IN KILN GASIFIER
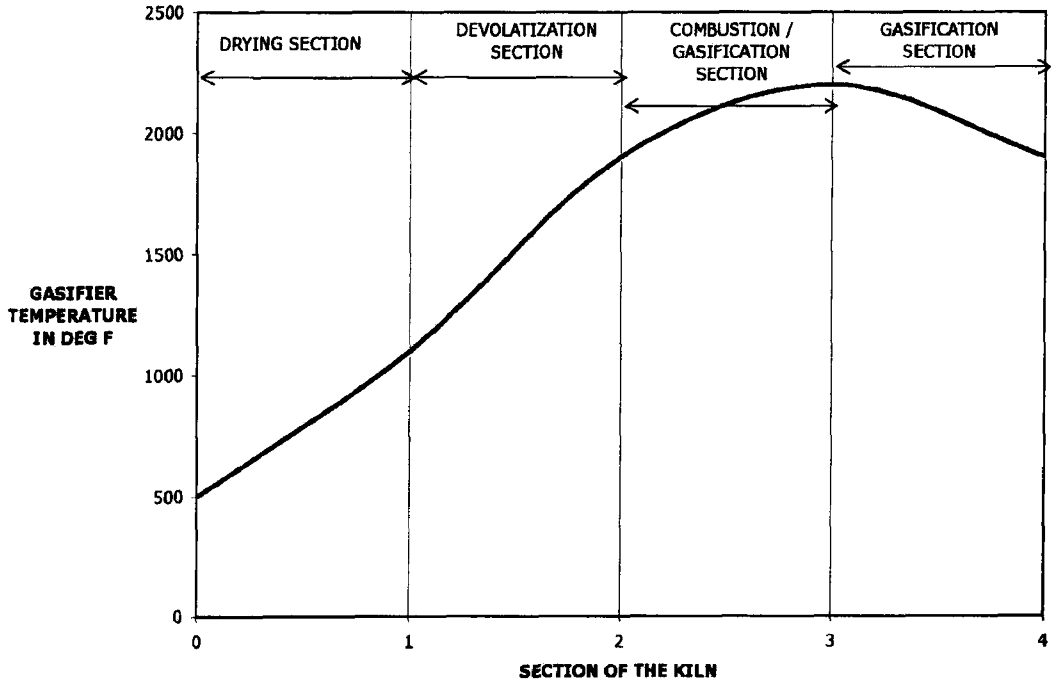

GAS DISTRIBUTION ARRANGEMENT FOR ROTARY REACTOR

PRIOR RELATED APPLICATION DATA

This application is a continuation of U.S. application Ser. No. 12/463,848, filed May 11, 2009, which claims priority to Indian Patent Application No. 1157/CHE/2008, filed May 12, 2008, the entire content of which is incorporated herein by reference in its entirety.

BACKGROUND OF INVENTION

1. Field of Invention

This invention relates to reactors such as rotary kilns for the gasification of mixed size of solid carbonaceous materials such as biomass and solid wastes in a tumbling state and particularly to the gas distribution port for introducing gases such as air, oxygen, and steam to the interior of the rotary kiln wherein this gas distributor assures gas solid mixing inside the reactor to promote gas solid reaction.

2. General Background and the State of the Art

In the last two decades or so, interest in biomass gasification has picked up as means of producing energy from renewable resources to supplement the foreign imports as well as to develop strategy for distributed generation for reasons of meeting energy security needs. This renewed interest has encouraged development of new and improved methods for making biomass gasification efficient and fuel gas generated from these cleaner in terms of its tar content. Biomass typically comprises collectable, plant-derived materials that may be readily abundant and relevantly inexpensive in comparison to fossil fuels. Additionally, biomass may be potentially convertible to feedstock chemicals or used for electricity generation. Some examples of sources of biomass may be, without limitation, wood, grass, agriculture and farm wastes, manure, waste paper, rice straw or rice husks, corn stores, corn cobs, sorghum stover, poultry litter, sugarcane bagasse, waste resulting from vegetable oil extraction, peanut shells, coconut shells, shredded bark, food waste, urban refuse and municipal solid waste.

The present invention is directed to a reactor vessel in which solid, liquid and gaseous organic wastes such as but not necessarily limited to forestry and agricultural residues, animal wastes, bacterial sludge, sewage sludge, municipal solid waste, food wastes, animal bovine parts, fungal material, industrial solid waste, waste tires, coal washing residue, petroleum coke, oil shale, even coal, peat and lignite, waste oil, industrial liquid wastes, residuals from petroleum refining and volatile organic compounds generated by the industrial processes are transformed into gaseous fuels with maximum conversion efficiency while maintaining resultant synthesis fuel gas free of tar and oil. The organic materials of this type commonly referred to as carbonaceous materials include fixed carbon, volatile matter and ash.

Moisture present with all of the carbonaceous is also included in the volatile matter. The primary objective of the transformation is to obtain essentially complete conversion of carbon and volatile matter into synthesis fuel gas, while leaving only ash as solid residue. This transformation of the organic material takes place by combining these organic materials with steam and air or oxygen in a high temperature environment. Gas-solid contact, the temperature and the time allocated for gas-solid contact at a given temperature all play a role in the extent of conversion of the organic material introduced into the reactor vessel. Most of the time, the moisture content of the organic feed material is adequate for the transformation reactions. However, the present invention also includes the benefits of introducing additional moisture to produce uniform quality of the synthesis gas from this apparatus. The present invention does not preclude pre-drying of the organic feed material prior to its introduction into the reactor vessel.

The advantages of converting organic material into synthesis fuel gas over directly combusting the carbonaceous material are quite significant. Direct combustion of carbonaceous materials mentioned above usually results in smoke and discharge of unwarranted polluting compounds to the detriment of human health. Besides, direct combustion results in deposition of tar in the chimneys which poses a fire hazard. In contrast, the synthesis fuel gas, after production and clean-up, contains simple clean burning combustible gases, namely carbon monoxide, hydrogen and some methane along with non-combustible nitrogen, carbon dioxide and water vapor. This synthesis fuel gas is also suitable for fuel use for internal combustion engines.

The ideal device for the transformation of carbonaceous material into synthesis fuel gas would comprise of ability to introduce all types of carbonaceous materials without limitations in reason of its origin, size, and composition and that would also provide ideal mixing between solids present in the device and gas including air and steam that is introduced into the apparatus. There are number of devices that are capable of transforming all sorts of carbonaceous materials into synthetic fuel gas; however, none of them are without limitations.

For example, the bubbling fluidized bed reactors are well known for providing ideal contact between solids and gases; however, these devices lack versatility with respect to handling multiple types and sizes of carbonaceous materials. The operation of fluidized bed device is generally restricted to one particular type and one size of carbonaceous material since any variation in these would upset the delicate balance between fluidization velocity and the size of the carbonaceous material as well as the balance between the composition of the carbonaceous material and amount of reaction gases such as air and steam introduced into the reactor.

Another example of reactor with good contact between solid and gas is the circulating entrained bed reactor. This type of reactor increases contact time between the solids and gases by continuous recirculation of the solids inside the reactor vessel. Again this type of reactor lacks versatility with respect to type and size of the carbonaceous material.

In the small-scale category of the available reactors, common ones are updraft gasifiers, downdraft gasifiers, and cross-draft gasifiers. All of these types of reactors have restrictions with respect to the density and the size of the carbonaceous material they can handle. Besides none of these reactors have ability to provide ideal mixing between solids and gases which is a prerequisite for obtaining maximum conversion of carbonaceous material into synthesis fuel gas. As a result of poor mixing, these reactors lose significant amount of carbon with the solid residue.

In comparison to all of the aforementioned devices, the rotary reactor such as kiln is most flexible and versatile in terms of handling vast array of carbonaceous material irrespective, within reasons, of type, composition, and size. The rotary kiln device is also suitable for operating at full load and part load as necessitated by synthesis fuel gas demand or by availability of the carbonaceous material. The primary weakness of the rotary kiln is gas solid mixing without which it is difficult to attain high conversion of carbonaceous fuel into synthesis fuel gas. In a study performed by CPL Industries (Reference 1), it was quite apparent that without allowing provisions for suitable mixing inside the kiln it was not possible to attain high transformations of carbonaceous fuel into synthesis fuel gas. Without adequate mixing between solids and gases, the air and steam has tendency to bypass reaction with solids and instead prefers to react with gases thereby impairing the quality of synthesis fuel gas with respect to its heating value. Moreover the bypassing of air and steam results in lower conversion of carbonaceous material and hence lot of carbon is lost with the solid residue.

The present invention provides an apparatus to systematically introduce air, steam, and other gases according to the dictates of the gasification reactions which when installed inside of the rotating reactor such as kiln tremendously improves gas solid mixing inside the reactor and thereby assures maximum conversion of carbonaceous material into synthesis fuel gas. With this ability for gas solid mixing and its inherent flexibility with respect to accepting wide array of carbonaceous material irrespective of type, composition, and size; and combined with its ability to operate within large variation of loading of the carbonaceous material, the kiln reactor would become the reactor of choice for distributed power generation for smaller and larger applications.

Some prior attempts to provide improved gas solid mixing in a rotary kiln as well as attempts to improve conversion of carbonaceous material into synthesis fuel gas in rotary kiln by indirect means are mentioned below.

DESCRIPTION OF PRIOR ART

In the prior art, rotary kilns are known where the air, steam, and fuel are admitted into the reactor over its entire length by providing plurality of ports through the shell of the kiln. Examples of these arrangements are disclosed in the U.S. Pat. Nos. 1,216,667, 2,091,850 and 3,182,980. The port arrangements for such kilns are disclosed in U.S. Pat. Nos. 3,794,483; 3,946,949; and 4,214,707. In certain of the prior art, e.g., U.S. Pat. No. 2,091,850, the air is injected into the kiln through hundreds of ports drilled into the shell of the kiln. Even though this art provides means of introducing air into the kiln either below the material charge of the bed or when the ports are above the bed, its operation, control, and maintenance is cumbersome. If aforesaid apparatus is operated to process mixed size materials containing particles having smaller diameter than the port, these smaller particles may enter the ports and the associated piping causing the clogging of the ports and thereby restricting the flow of air into the reactor. When the blockage occur in several of these ports, the amount of air that can be introduced into the reactor decreases correspondingly and therefore the capacity of the kiln is also reduced correspondingly. This sort of impairment also increases the necessity of maintenance and hence increases the downtime of the reactor.

In U.S. Pat. No. 4,214,707 improvement in port design to prevent material from entering port and associated piping has been disclosed by making these ports self purging. In this art, each port has a nozzle having a plurality of orifices for introducing air into the kiln. Behind the nozzle is a labyrinth trap. Particulates from the kiln are allowed to pass through the nozzle orifices into the trap as the port passes beneath the material in the kiln. A plurality of orifices in the trap causes air to swirl as the air passes through the trap and carry them into the kiln. While this improvement act to prevent particulate material from entering the associated port pipe, some of the very smallest particulate material will eventually elude this screening mechanism and pass into the piping and eventually cause a restriction for the air flow into the reactor.

Further improvements for the port design which are confined entirely on the shell of the kiln are enumerated in U.S. Pat. Nos. 4,373,908 and 4,373,909 in which design to prevent nozzle blockage is taught. This method, however is complex and tedious.

Because of difficulties associated with introducing air and steam uniformly into a rotating reactor to communicate effectively with the solids residing in the kiln, many investigators have resorted to completely avoiding introduction of these gases into the reactor and instead have resorted to convert biomass and other carbonaceous materials into fuel gas by indirect heating of the shell of the kiln. In one of the studies conducted by Androutsopoulos and Hatzilyberis (Reference 2), the investigators operated the rotary kiln reactor for the gasification of lignite coal under allothermal conditions in which heat was supplied to the reactor by indirect heating of the kiln shell. The composition of the gas was found to be comparable to that produced by the gasification reactors with intense gas solid mixing. The investigators stated the advantage of kiln reactor as being able to process wide range of particle size without need for screening as is generally the case with other type of reactors such as fluidized bed and entrained bed reactors. This study did not mention the extent of the conversion of the lignite coal in the absence of the direct injection of the air into the reactor; however judging from another study with and without air injection into the kiln reactor (Reference 1), the conversion of coal attained would be suspected to be at the lower end.

Another similar study by Fantozzi, D'Alessandro, and Desideri (Reference 3), the investigators again relied on indirect heating of the kiln shell to generate fuel gas from the biomass. In this study it is implied that significant amount of carbon is left in the solid residue and unless used as fuel for indirect heating of the kiln shell, the process efficiency for converting biomass into fuel gas is greatly diminished.

In the U.S. Patent Application Number 20050095183, a method for introducing air and steam into the kiln is disclosed. In this method, stationary pipe divided into several segments with plurality of ports is fixed inside of the kiln and which is supported by the stationary ends of the kiln. Various configurations of the ports are disclosed to introduce air and steam into the reactor. This port is however based on uniform disbursement of air and steam from around each section of the port which may result largely in undesirable gas to gas reaction rather than intended gas to solid reaction. The gas solid mixing is greatly dependent upon the positioning of the stationary pipe and the size and the location of the ports with respect to the solids residing in the kiln. This particular distributor has limited ability to cause intense mixing between the gas and solids in the reactor which is a prerequisite for causing optimum conversion of solid biomass and other solid carbonaceous fuels into gaseous fuel. The present invention is an improvement on this particular aspect of gas solid mixing inside the kiln reactor.

SUMMARY OF THE INVENTION

According to a preferred embodiment of the present invention, there is provided a port assembly secured by the stationary plate of the rotary kiln and positioned for communication with the interior of the rotary kiln to deliver independently controlled flow of reactant gases to predetermined sections of the rotary kiln and such that the reactant gases are in intimate contact with the solids present inside the rotary kiln. The port assembly comprises of a main conduit extending from front to the rear of the rotary kiln. The conduit is divided into four or more sections for introducing gases such as air, oxygen and steam into the kiln at the locations inside the kiln coinciding with the specific sections of the conduit. Each section of the conduit communicates independently to the supply of reactant gases for that particular section. The amount of gas and the composition of gas supplied to each of the section is independently controlled to commensurate with the specific gas solid reaction requirement at a particular stage of reaction along the rotary kiln. The conduit is placed along the vertical axis of the rotary kiln and positioned such that the lower portion of the conduit is immersed in the layer of solids present at the bottom of the rotating kiln. Each section of the port assembly communicates with the kiln through the plurality of the nozzles drilled into each section of the port. The nozzles are confined to lower third circumference of the conduit to prevent escape of reactant gases into the main gas stream without having first contacted with the solids present in the rotary kiln. The immersion of the lower section of the conduit into the layer of solids residing on the bottom of the kiln promotes intimate mixing between the gas and solids and thereby accords first opportunity for reactant gases to react with solids prior to merging into main gas stream in the rotary kiln.

For a typical gasification of carbonaceous material such as biomass with air or oxygen and steam, there are at least four stages of reactions that take place along the rotary kiln. In the first stage of reaction, as soon as the biomass is introduced into the rotary kiln gasifier, the biomass gravitates towards the bottom of the kiln and comes into contact with hot refractory lining which is holding the heat. The heat is transferred from the refractory to the biomass and as a result the temperature of the biomass rises which in turn causes the moisture in the biomass to evaporate. The reactant gases introduced in this zone merely helps to carry the devolatilized moisture into the main gas stream of the kiln. In the first zone depending upon the size of the zone, capacity of the kiln in terms of the feed rate of the carbonaceous material into the kiln, the temperature of the refractory, and the heat capacity of the refractory, the temperature of the biomass may attain temperature as high as 500 deg F. This zone of the rotary kiln gasifier is termed as drying section.

In the second stage, the temperature of the biomass continues to rise as the heat continues to transfer from the refractory to the biomass. As the temperature of the biomass continues to rise, the volatile organics begin to be released from the biomass. This zone of the rotary kiln gasifier is termed as devolatalization zone. The temperature in this zone typically rises to more than 1000 deg F. which corresponds to flash point of many of the organic compounds which are being released from the biomass. The reactant gases introduced in this zone, especially the oxygen-bearing gases such as air will begin reacting with these organic compounds to break them into simpler compounds. The steam present in the reactant gases would do the likewise destruction of the heavier organic compounds to yield simpler compounds.

Once the biomass and the attendant organic compounds have attained the ignition temperature in the third zone of the reactions, the air and/or oxygen present in the reactant gases begin to partially combust the volatile organic compounds emanating from the biomass in contact with the hot refractory and also combusts portion of carbon present in the devolatalized biomass. This combustion is necessary to carry out the reactions between gases and solids and also to maintain temperature in the reactor that would sustain endothermic reactions between steam and the carbonaceous materials to yield synthesis fuel gas. The temperature in this zone could rise way beyond 2000 deg F. but it is generally controlled to less than 2200 deg F. by limiting the amount of oxidant introduced in this zone. The temperature control is also necessary to maintain the integrity of the refractory. The combustion reaction also replenishes the heat to the refractory lining so that process can be carried out in a continuous manner. The combination of high temperature and availability of heat released from partial combustion also allow the endothermic reaction between the carbon present in the devolatalized biomass and steam present in the reactant gases to take place in this zone. The partial combustion reactions produces mixture of carbon monoxide and carbon dioxide and the reactions between steam and carbon produces the mixture of hydrogen, carbon monoxide, and carbon dioxide. In this zone, since the temperature is high, some of the steam will also react with organic compounds formed in the second zone and break those organic compounds to methane, hydrogen, carbon monoxide, and carbon dioxide. This zone of partial combustion and gasification is termed as combustion/gasification section. Ideally, major fraction of the reactant gases is introduced in this section.

In the fourth zone of the reaction, termed as gasification section, the reactant gases comprise primarily of steam. The use of oxidant is generally avoided since oxygen in this zone may preferentially tend to react with fuel gases produced in the earlier sections and thereby depleting its calorific value. In contrast, because of the reaction conditions at high temperature are more conducive for carbon steam reactions, it is preferred that steam is allowed to react with last bit of carbon present in the devolatalized and partially combusted biomass to produce more hydrogen and carbon monoxide. This zone also provides additional residence time for remaining heavy volatile compounds to break down into smaller and simpler compounds by reactions with steam.

Overall the gasification reactions consume less than fifty percent of stoichiometric oxygen required for complete combustion of the carbonaceous material. The quantity of gas produced in the kiln is significantly smaller than that produced during total combustion of the carbonaceous materials. Therefore the gasification equipment is much smaller than the combustor. It is also much easier and economical to clean the small quantity of gas. After cleaning the gas for the removal of chlorine and sulfur compounds formed during gas solid reactions taking place at various stages inside the rotary kiln gasifier, the fuel gas comprising of carbon monoxide, hydrogen, carbon dioxide, residual nitrogen, residual steam, and smaller hydrocarbon compounds such as methane and ethane is the final product available for use as clean fuel for boilers or for gas engines.

Thus it is apparent from the above description that the size of each section of the port assembly and the amount and the type of reactant gases introduced into the rotary kiln gasifier through each of these section largely depends upon the properties of the carbonaceous material being processed in the rotary kiln gasifier and can be adjusted accordingly. Any and all of these alterations are implied and included in this invention.

For best results it is necessary to employ conduit of adequate size that will enable adequate flow of the reactant gases to the appropriate reaction section within the rotary kiln. It is also necessary to employ adequate size of conduit that communicates each section of the gas port to the supply of the reactant gases. It is also necessary to provide adequate number and adequate size of the nozzles within each section of the port to deliver adequate reaction gases to the appropriate reaction section within the rotary kiln without compromising the available pressure drop for the reactant gas supply. In order to assure intended gas supply from a particular section of the port, the area of the nozzles provided in that particular section should at least be equal to the area of the conduit that communicates that particular section of the port to the reactant gas supply.

BRIEF DESCRIPTION OF THE DRAWINGS

FIG. 1 is a schematic of general arrangement of the gas distribution port for a rotating kiln gasifier.

FIG. 2 is a depiction of reactions taking place within the rotary kiln gasifier.

FIG. 3 is a bottom view of the interior portion of the gas distribution port.

FIG. 4 is a cross section of the kiln gasifier with gas distribution port.

FIG. 5 is an expanded cross section view of the port assembly section in the interior of the rotary kiln.

FIG. 6 is a depiction of temperature profile inside the rotary kiln gasifier.

DETAILED DESCRIPTION OF THE INVENTION

FIG. 1 depicts one of many types of rotary kiln apparatus with which the present invention can be practiced. Referring to FIG. 1, the rotary kiln gasifier 1 is a hollow refractory lined vessel with suitable inlets for feeding carbonaceous material 2, suitable inlet for feeding reactant gases such as air and steam 3, suitable outlet for fuel gas 4, and suitable outlet for ash 5. The rotary kiln depicted in FIG. 1 can also operate as combustor with equal effectiveness. The gasifier 1 should be large enough to gasify desired capacity of carbonaceous material and to provide adequate residence time for the gasification reactions between carbonaceous materials and the gaseous reactants. The interior of the gasifier 1 is preferably refractory lined 6 or alternatively surrounded by heat transfer devices such as tubes containing flowing liquids to absorb heat. The refractory lined kiln is preferred because the hot refractory retains heat and transfers that heat to the carbonaceous material coming in its contact thereby raising the temperature of the said carbonaceous material and thereby making it easier for gaseous reactant to initiate gasification reactions with the said solids.

Because of the nature of the rotating kiln, when the carbonaceous solid material is introduced into the said kiln, the solid carbonaceous material generally gravitates towards the walls and ultimately to the bottom of the said kiln. In contrast the flow of gas introduced at the head of the kiln flows through the middle of the kiln and as a result minimal interaction between the solids and gas is expected in this type of devices. In order to get maximum benefit out of this type of devices it is essential to maximize gas-solid interaction. This is exactly what the rotating gas distributor 7 of the present invention achieves.

The gas distributor 3 is essentially a gas port as a means of introducing and distributing reactant gases such as gaseous fuel, air, oxygen, and steam into the rotary kiln for processing of any solids to attain maximum interaction between the solid materials present in the kiln with the reactant gases that are being introduced through the said gas distributor. The example here depicts one application of the invention for the gasification of biomass which requires four stages of reaction for converting it into gaseous fuel gas. The invention is described for this specific application without departing from the main spirit of the invention so that the embodiments of the invention are properly understood.

The gas port 3 is supported at both ends of the kiln by the front and rear hoods of the kiln with sealed insertions 7 and 8 respectively and comprises of a conduit which is divided into four noncommunicating sections 9, 10, 11, and 12. Each of the section 9, 10, 11, and 12 communicates with the gas supply via other conduits 13, 14, 15, and 16. The supplies of gas to each of these conduits are independently controlled by control valves 17, 18, 19, and 20. The quantity and the composition of the reactant gases vary according to the dictates of the solids processing. For gasification of biomass exemplified here, the reactant gases comprises primarily of air, oxygen, and steam. The length of each of the four noncommunicating sections 9, 10, 11, and 12 are dependent upon type of material being processed. Similarly, the diameters of the conduits 13, 14, 15, and 16 also depend upon the material being processed and the processing capacity of the rotary kiln gasifier.

The four stages of reactions required for complete gasification of the biomass include drying to remove moisture from the biomass; devolatalization of organic compounds from the biomass; partial combustion of biomass to provide heat required for sustaining reactions necessary for drying, devolatalization, and gasification; and finally the gasification of residual biomass after the moisture and volatile organic compounds are removed from the biomass. FIG. 2 depicts the sections of rotary kiln where these reactions occur. Following is brief description of reactions occurring in these four sections of the rotary kiln and which are supported by reactant gases supplied independently to each of the sections 9, 10, 11, and 12 of the gas distribution port.

In the first stage of reaction, as soon as the biomass is introduced into the rotary kiln gasifier, the biomass gravitates towards the bottom of the kiln and comes into contact with hot refractory lining 6 which is holding the heat. The heat is transferred from the refractory to the biomass and as a result the temperature of the biomass rises which in turn causes the moisture in the biomass to evaporate. The reactant gases introduced in this zone merely helps to carry the devolatilized moisture into the main gas stream of the kiln. In the first zone depending upon the size of the zone 9, capacity of the kiln in terms of the feed rate of the carbonaceous material into the kiln through inlet 2, the temperature of the refractory 6, and the heat capacity of the refractory 6, the temperature of the biomass may attain temperature as high as 500 deg F. This zone of the rotary kiln gasifier 1 is termed as drying section 9 as shown in FIG. 2.

The primary reaction in this drying section of the rotary kiln 1 is evolution of the moisture from the biomass represented as:

Wet Biomass+Heat.fwdarw.Dry Biomass+Steam

In the second stage of the gasification reactions, termed as devolatalization section 10, the temperature of the biomass continues to rise as the heat continues to transfer from the refractory 6 to the biomass. As the temperature of the biomass continues to rise, the volatile organics begin to be released from the biomass. The temperature in this zone typically rises to more than 1000 deg F. which corresponds to flash point of many of the organic compounds which are being released from the biomass. The reactant gases introduced in this zone, especially the oxygen-bearing gases such as air will begin reacting with these organic compounds to break them into simpler compounds. The steam present in the reactant gases would do the likewise destruction of the heavier organic compounds to yield simpler compounds.

The gasification reactions occurring in devolatalization section of the rotary kiln 1 are represented as:

Pyrolysis

Biomass+Heat.fwdarw.$CH_4$+CO+$CO_2$+$H_2O$+$H_2$+Alcohols+Oils+Tars+C

Gasification

CnHmOp+x$O_2$+(2n−2x−p)H2O+Heat.frwdarw.(n−y)CO2+(2n−2x−p+m/2−y)H2+yCO—+yH2O

Where x the oxygen-to-fuel molar ratio and y is the number of moles of CO2 that reacts with H2 to produce CO and H2O due to the water gas shift reaction. This reaction is exothermic at low values of x, and exothermic at high values of .xi. At an intermediate value (x0), the heat of reaction is zero, and is called auto-thermal reforming.

In the third stage of gasification depicted in FIG. 2 as Combustion/Gasification section corresponding to the third section 11 of the gas distribution port 3 some of the crucial reactions occur. Because of continued exposure to heat from the refractory lining 6 and because of partial combustion of evolved organic compounds in devolatalization, the biomass is sufficiently heated up to reach ignition temperature with incoming reactant gases especially with oxygen bearing gases. Once the biomass and the attendant organic compounds have attained this ignition temperature in the third zone of the reactions, the air and/or oxygen present in the reactant gases begin to partially combust the volatile organic compounds emanating from the biomass in contact with the hot refractory 6 and also begins to combust portion of carbon present in the devolatalized biomass. This combustion is necessary to carry out the reactions between gases and solids and also to maintain temperature in the rotary kiln reactor 1 that would sustain endothermic reactions between steam and the carbonaceous materials to yield synthesis fuel gas. The temperature in this zone could rise way beyond 2000 deg F. but it is generally controlled to less than 2200 deg F. by limiting the amount of oxidant introduced in this zone. The temperature control is also necessary to maintain the integrity of the refractory 6. The combustion reaction also replenishes the heat to the refractory lining so that process can be carried out in a continuous manner. The combination of high temperature and availability of heat released from partial combustion also allow the endothermic reaction between the carbon present in the devolatalized biomass and steam present in the reactant gases to take place in this zone. The partial combustion reactions produces mixture of carbon monoxide and carbon dioxide and the reactions between steam and carbon produces the mixture of hydrogen, carbon monoxide, and carbon dioxide. In this zone, since the temperature is high, some of the steam will also react with organic compounds formed in the second zone and break those organic compounds to methane, hydrogen, carbon monoxide, and carbon dioxide. This zone of partial combustion and gasification is termed as combustion/gasification section. Ideally, major fraction of the reactant gases is introduced in this section 11 of the gas distribution apparatus.

The following reactions take place in this combustion/gasification section of the rotary kiln:

Pyrolysis

Biomass+Heat.fwdarw.$CH_4$+CO+$CO_2$+$H_2O$+$H_2$+Alcohols+Oils+Tars+C

Gasification

C nHmOp+x$O_2$+(2n−2x−p)H2O+Heat.fwdarw.(n−y)CO2+(2n−2x−p+m/2−y)H2+yCO—+yH2O

Where x the oxygen-to-fuel molar ratio and y is the number of moles of CO2 that reacts with H2 to produce CO and H2O due to the water gas shift reaction. This reaction is exothermic at low values of x, and exothermic at high values of .xi. At an intermediate value (x0), the heat of reaction is zero, and is called auto-thermal reforming.

Char Combustion

C+O2.fwdarw.CO2+Heat

Carbon Steam Reaction

*C*+*H*2O+Heat.fwdarw.CO+H2

Hydrogen Combustion

H2+½O2.fwdarw.H2O+Heat

Reverse Boudard Reaction

C+CO2+Heat.fwdarw.2CO

Water-Gas Shift

CO+H2O.fwdarw.CO2+H2+Heat

In the fourth zone of the reaction reactions, termed as gasification section corresponding to fourth section 12 of the gas distribution assembly 3, the reactant gases comprise primarily of steam. The use of oxidant is generally avoided since oxygen in this zone may preferentially tend to react with fuel gases produced in the earlier sections and thereby depleting its calorific value. In contrast, because of the reaction conditions at high temperature are more conducive for carbon steam reactions, it is preferred that steam is allowed to react with last bit of carbon present in the devolatalized and partially combusted biomass to produce more hydrogen and carbon monoxide. This zone also provides additional residence time for remaining heavy volatile compounds to break down into smaller and simpler compounds by reactions with steam. Because of promoting endothermic reaction in gasification zone, and because the heat of reaction is derived from the bulk of the gases leaving the combustion/gasification section of the rotary kiln gasifier 1, the bulk temperature of gases in this zone drops by 200 to 300 deg F. The drop in gas temperature is largely dependent upon amount of residual carbon as well as on the amount of steam introduced in the fourth section 12 of the gas distribution assembly 3.

The primary reaction promoted in gasification zone of the rotary kiln 1 is the gasification of residual carbon present in the devolatalized and partially combusted biomass and which is represented by:

Carbon Steam Reaction

C+H2O+Heatlwdarw.CO+H2

When the fuel gas exits the fuel gas outlet 4, the temperature of the gas would be 1700 to 1900 deg F. and the fuel gas would be made up mostly of C, CO2, H2, N2, H2O, and CH4. Some traces of impurities such as ammonia, hydrogen chloride, and hydrogen sulfide may also be present. These impurities will be washed down by a suitable chemical scrubber prior to using the fuel gas.

FIG. 3 is a depiction of one of many possible nozzle arrangements that is provided at the bottom of each of the interior section 9, 10, 11, and 12 of the gas distribution port 3. The total area of the plurality of the nozzles 21, 22, 23, and 24 corresponding to each of the interior section 9, 10, 11, and 12 corresponds with the area of the conduits 13, 14, 15, and 16 that communicates each of the interior sections 9, 10, 11, and 12 with the corresponding reactant gas supply. This way the reactant gases are introduced to the interior of the rotary kiln without significant loss of pressure.

FIG. 4 is a cross section of one of the four sections 10 of the gas distribution port 3 to illustrate the circumferential confinement of the plurality of the nozzles 22. For best results, the nozzles are confined within the bottom third circumference of the conduit of the gas distribution port 25 and disbursed all along the length of the interior section of the gas distribution port 3. The circumferential confinement of the nozzles 25 is largely dependent upon the thickness layer of solids 27 present at the bottom of the refractory lined rotary kiln 6 and the relative positioning of the gas distribution port 3 because as preferred embodiment of this invention, all of the nozzles 21, 22, 23, and 24 are embedded within the layer of solids 26 that are processed in the rotary kiln 1. The circumferential confinement for the nozzle can be extended or reduced from one third of the circumference for specific applications to meet the condition of embedding all of the nozzles within the solid layer at the bottom of the rotary kiln. The positioning of the conduits 13, 14, 15, and 16 within the corresponding sections 9, 10, 11, and 12 of the gas distribution port are not critical as long as they communicate unhampered with the corresponding reactant gas supplies.

FIG. 5 is merely an expanded view of the cross section of one of the section 10 of the gas distribution port 3.

FIG. 6 is a depiction of typical temperature profile inside of the rotary kiln 1 when it is used as biomass gasifier. The maximum temperature is reached in the combustion/gasification section of the kiln.

The present invention is also useful when practiced as combustor instead of gasification. In this case, only air and/or oxygen is used for reactant gas in all sections 9, 10, 11, and 12 of the gas distribution port 3. The amount of air or oxygen introduced will commensurate with the combustor capacity with respect to the carbonaceous material being combusted. The principles stated with respect to nozzle locations, spacing, and orientation as well as the gas flow in each of the sections 9, 10, 11, and 12 will be somewhat different than in the case of the gasification in order to attain complete combustion of the carbonaceous material as well as to maintain suitable temperatures within the rotary kiln.

For person familiar with the art of gasification and combustion will recognize that for gasification, the amount of air or oxygen introduced into the gasifier 1 is less than fifty percent of the stoichiometric requirement for the complete combustion of the carbonaceous material being gasified whereas in the case of complete combustion, the amount of air introduced into the kiln reactor 1 sometimes exceeds 200 percent of the stoichiometric requirement of the complete combustion of the carbonaceous material to modulate the temperature inside the rotary kiln and also depending upon the specified exit temperature for the outlet gas in the gas outlet 4.

The present invention has several advantages.

One advantage is that by allowing intimate contact between gas and carbonaceous solids within the kiln gasifier, it is possible to obtain complete utilization of the carbonaceous material.

Another advantage is that by allowing intimate contact between the gas and the solids in the vicinity of heated refractory lining of the kiln, the drying, devolatalization, partial combustion, and gasification reactions of the carbonaceous material with reactant gases occur much more rapidly since the requisite heat for gasification is provided by the heat retained by the refractory lining as well as by the partial combustion of the carbonaceous material.

Yet another advantage is rotation of the gas distributor which enables added turbulence at the wall of the rotary kiln gasifier thereby increasing the interaction between gas and the solids for attaining optimal reaction and better utilization of carbonaceous material.

Whilst the invention has been described in detail in terms of specific embodiment thereof, it will be apparent that various changes and modifications can be made by one skilled in the art without deviating from the spirit and scope thereof. One skilled in art will also realize that this invention is applicable for broad range of solids processing in the rotary kiln, all of which are included by inference.

REFERENCES

1. J. H. Howson and K. Casnello "Risk Reduction Measures for the Development of Biomass Rotary Kiln Gasification," Report No. ETSU B/U1/00646/REP and DTI/Pub URN 02/754, issued by DTI Sustainable Energy Programmes for CPL Industries, 2002.

2. G. P. Androutsopoulos, K. S. Hatzilyberis, "Electricity Generation And Atmospheric Pollution The Role Of Solid Fuels Gasification" presented at 7th International Conference on Environmental Science and Technology Ermoupolis, Syros island, Greece, September 2001

3. Francesco Fantozzi, Bruno D'Alessandro, and Umberto Desideri, "An IPRP (Integrated Pyrolysis Regenerated Plant) Microscale Demonstrative Unit in Central Italy" Proceedings of ASME Turbo Expo 2007: Power for Land, Sea and Air, May 14-17, 2007, Montreal, Canada

What is claimed:

1. An apparatus for reacting solid reactants with gaseous reactants, comprising:

(a) a rotating refractory lined kiln having an inlet at a front end, an outlet for fuel gas at a back end, and an ash outlet:

(b) a main gas distributor within the kiln between the front end and the back end, wherein the distributor is divided to a drying section, a devolatization section, a combustion section, and a gasification section, wherein gas is supplied independently to the drying section by a first gas supply conduit having a first plurality of nozzles, to the devolatization section by a second gas supply conduit having a second plurality of nozzles, a combustion section by a third gas supply conduit having a third plurality of nozzles, and a gasification section by a fourth gas supply conduit by fourth plurality of nozzles;

(c) an introduction inlet for introducing carbonaceous solid reactants at the front end;

(d) a withdrawal outlet to withdraw processed solids located at the bottom of the back end; and (e) a source of the gas, wherein the gas includes oxygen, wherein the gas distributor traverses through the horizontal length of the kiln, and the ends allow free rotation of the kiln.

2. The apparatus as claimed in claim 1, wherein the gas distributor communicates with inside of the kiln with a plurality of nozzles along the length of the length of the gas distributor.

3. The apparatus as claimed in claim 2, wherein the gas distributor is cylindrical and the plurality of nozzles are provided along the one third and one half of the circumference of the gas distributor.

4. The apparatus as claimed in claim 1, the gas distributor is positioned in the lower half quadrant of the apparatus and is embedded within a boundary layer of the solid reactants or is outside of the boundary layer of the solid reactants and wherein the ports are positioned directly towards a solid reactant boundary layer on a circumferential wall of the rotating conduit.

5. The apparatus as claimed in claim 1, wherein the gas distributor is above a solid reactant boundary layer on a circumferential wall of the rotating kiln.

6. The apparatus as claimed in claim 1, wherein the gas distributor is within a rotary kiln and communicates with the kiln through at least one nozzle.

7. The apparatus as claimed in claim 1, wherein the first gas supply conduit is controlled by a first control valve, the second gas supply conduit is controlled by a second control valve, the third gas supply conduit is controlled by the third control valve, and the fourth gas supply conduit is controlled by a fourth control valve.

8. An apparatus for reacting solid reactants with gaseous reactants, comprising:

(a) a main horizontal gasifier along the length of a rotating refractory kiln with sealed stationary caps at a front end and the back end, wherein the kiln has a drying section, a devolatization section, a combustion section, and a gasification section, wherein the drying section is at a temperature of between about 500° F. to about 1000° F., the devolatization section is at a temperature between about 1000 and 1900° F., the combustion section is a temperature between about 1900° F. and 2200° F., and a gasification section at a temperature between about 2000° F. and 2000° F., wherein the combustion section, the gasification section, and the combustion sections are arranged horizontally along the entire length of the kiln;

(b) an introduction inlet for introducing solid reactants at the front end to drying section, (c) a withdrawal outlet to withdraw processed solids and solid residues from the gasification section, (d) a gas distributor within the kiln suppling the gas to the devolatization section, the combustion section, the gasification section, and the combustion sections, wherein the gas distributor distributes with at least four independent conduits; wherein the conduits are each connected to a plurality of nozzles, the gas distributor traverses through the horizontal length of the kiln.

9. The apparatus as claimed in claim 8, wherein the gas distributor is positioned in the lower half quadrant of the kiln and is embedded within a boundary layer of the solid reactants or is outside of the boundary layer of the solid reactants.

10. The apparatus as claimed in claim 8, wherein the first gas supply conduit is controlled by a first control valve, the second gas supply conduit is controlled by a second control valve, the third gas supply conduit is controlled by the third control valve, and the fourth gas supply conduit is controlled by a fourth control valve.

11. The apparatus as claimed in claim 8, wherein the gas distributor is cylindrical and the plurality of nozzles are provided along the one third and one half of the circumference of the gas distributor.

* * * * *